July 9, 1963  S. H. CREED ETAL  3,096,869
FRUIT FEEDING MECHANISM
Original Filed Nov. 30, 1956  13 Sheets-Sheet 1

FIG_1

INVENTORS
SHERMAN H. CREED
SANDOR CSIMMA
BY
ATTORNEY

July 9, 1963 S. H. CREED ETAL 3,096,869
FRUIT FEEDING MECHANISM

Original Filed Nov. 30, 1956 13 Sheets-Sheet 4

INVENTORS
SHERMAN H. CREED
SANDOR CSIMMA

BY *Hans G. Hoffmeister*

ATTORNEY

INVENTORS
SHERMAN H. CREED
SANDOR CSIMMA

United States Patent Office
3,096,869
Patented July 9, 1963

3,096,869
FRUIT FEEDING MECHANISM
Sherman H. Creed and Sandor Csimma, San Jose, Calif., assignors to FMC Corporation, San Jose, Calif., a corporation of Delaware
Original application Nov. 30, 1956, Ser. No. 625,368, now Patent No. 2,979,093, dated Apr. 11, 1961. Divided and this application Feb. 20, 1961, Ser. No. 90,250
15 Claims. (Cl. 198—33)

This invention pertains to fruit handling machines and more particularly relates to a mechanism for feeding fruit to fruit processing devices.

The present application is a division of our pending U. S. application for patent, Serial No. 625,368 filed November 30, 1956, issued April 11, 1961 as Patent No. 2,979,093.

An object of this invention is to provide a fruit preparation machine having a feed mechanism in which the fruit may be easily and efficiently positioned by the operator.

Another object is to provide means or positively seating and centering fruit in a fruit carrier.

Another object is to provide an improved feed means for a fruit processing machine.

Other and further objects and advantages of the present invention will become apparent from the following description taken in connection with the accompanying drawings in which.

Figure 1:
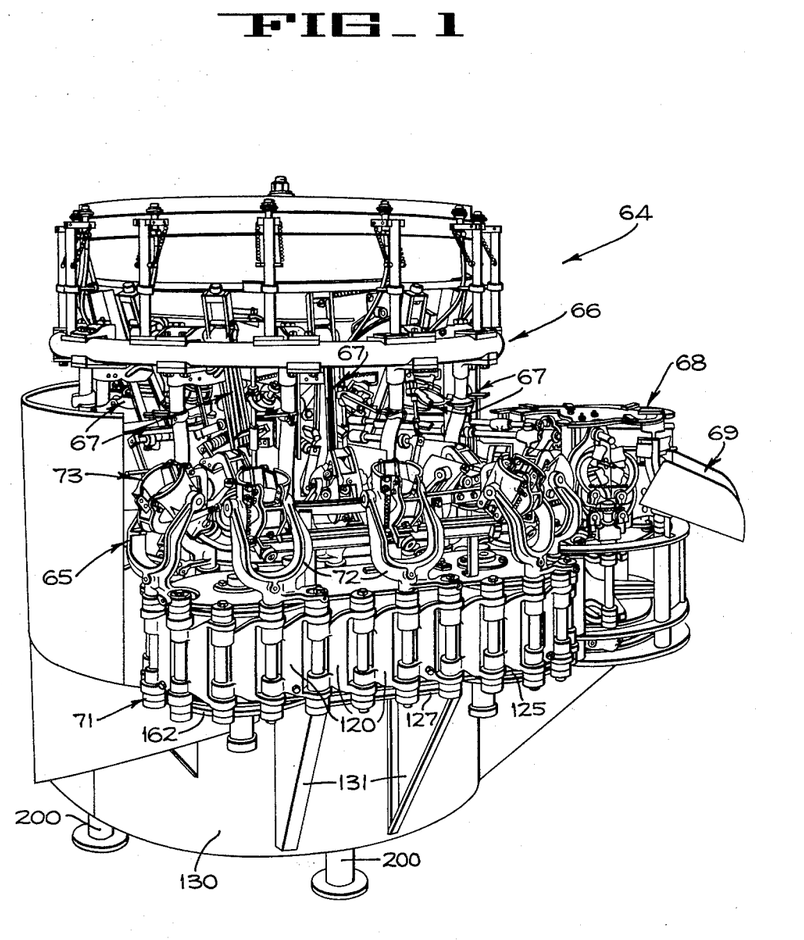
FIG. 1 is a perspective of the fruit preparation machine of the present invention.
Figure 2:
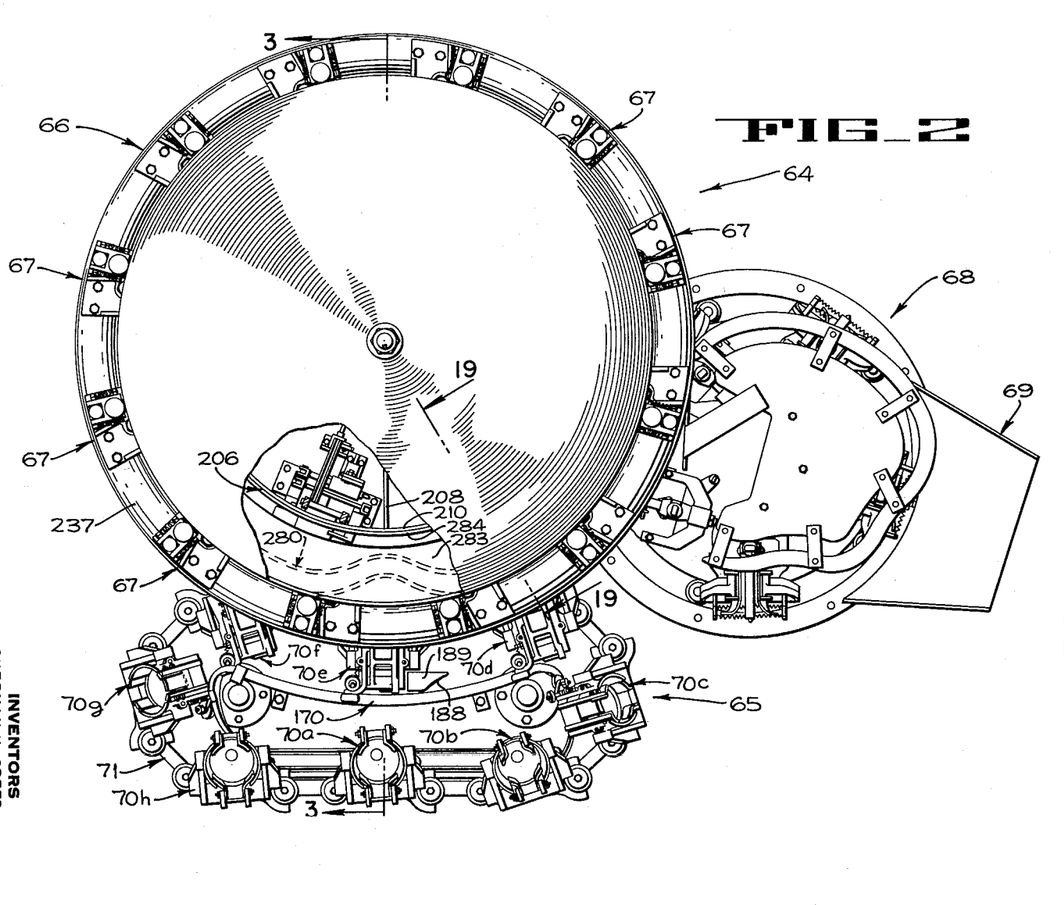
FIG. 2 is a plane view of the machine of FIG. 1, with a portion broken away.
Figure 3:
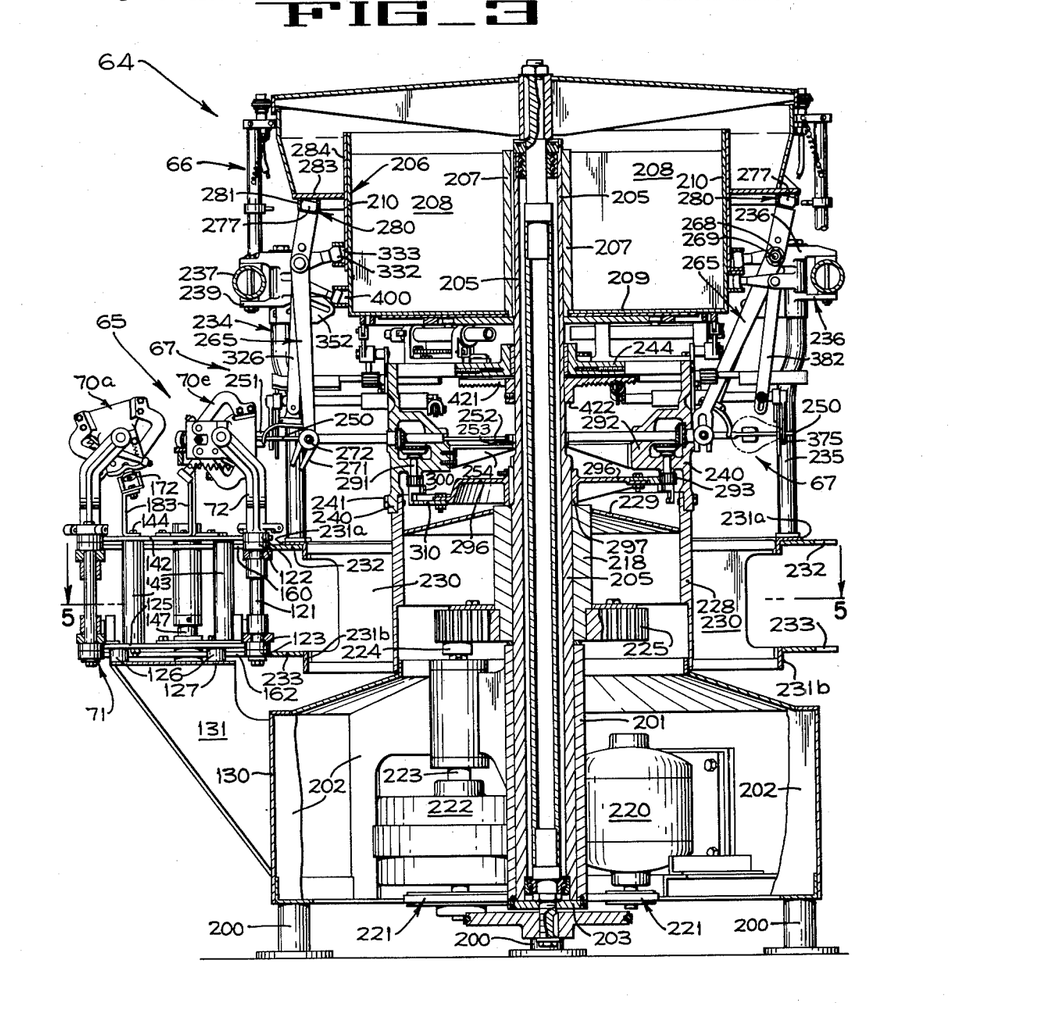
FIG. 3 is a vertical section taken on line 3—3 of FIG. 2.

The embodiment of the fruit feeding mechanism of the present invention chosen for description in the present application is used in a rotary pear processing machine that is indicated generally in FIGS. 1, 2 and 3 by the reference numeral 64 and comprises a pear feed mechanism 65, a rotary main turret 66 which carries a plurality of peeling, coring and stem-end trimming units 67, and a discharge turret 68 which receives each peeled, cored and trimmed pear from the main turret 66 and performs successive splitting, seed-cell removing, and blossom-end trimming operations prior to depositing the two halves of the pear on a discharge chute 69. The present application concerns the pear feeding mechanism 65 and certain parts of the main turret 66. The other mechanism are disclosed in the above-mentioned pending application to which reference may be had for a complete disclosure of said other mechanisms.

Figure 4:
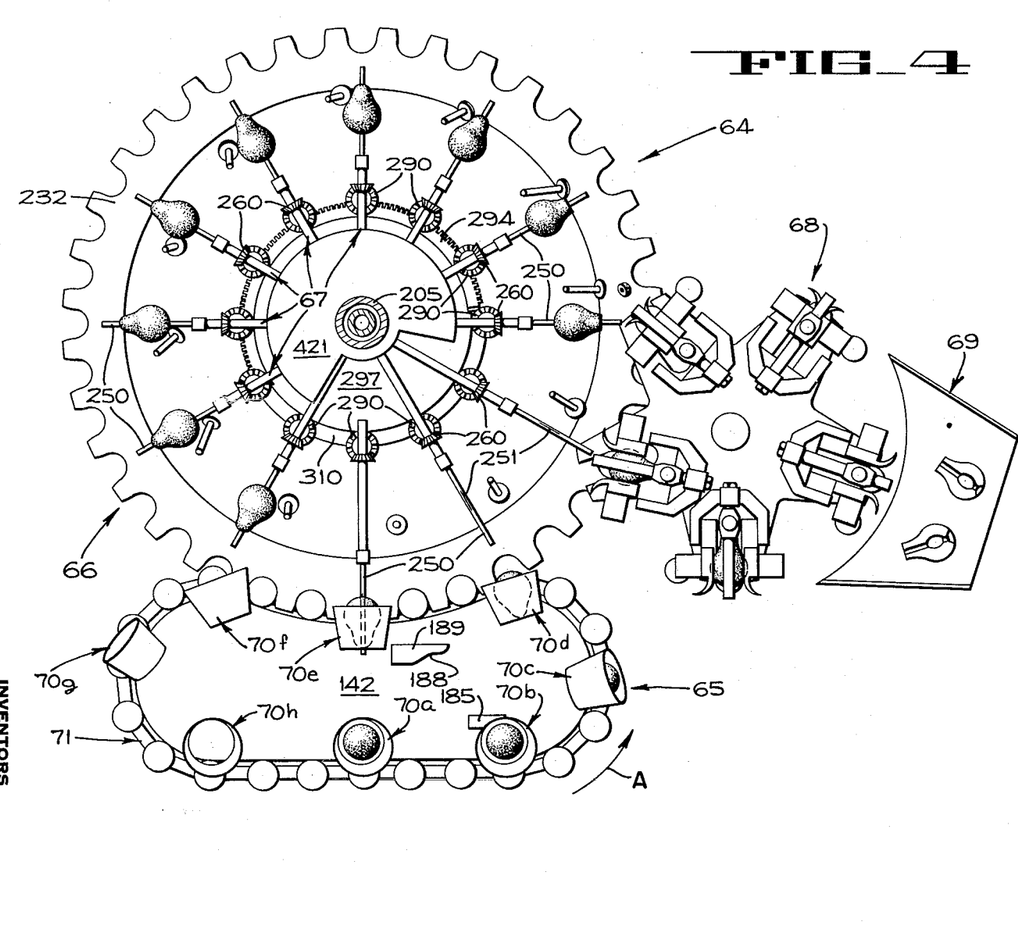
FIG. 4 is a diagrammatic plan view of a portion of the operating mechanism of the machine of FIG. 1.

The feed mechanism 65 of the machine (FIG. 4) comprises eight identical feed cups 70a through 70h, inclusive, which are mounted on an endless chain carrier 71 for movement in a circuitous path in the direction of arrow A. Pears are dropped, stem end down, into the cups when they are on the side of the feed mechanism 65 that is remote from the turret 66. In FIG. 4 the cup 70a is in open, pear-receiving position and is tilted approximately 15° from the vertical and toward the operator. As the loaded cups are carried around the circuitous path, they are closed and are tilted further, as indicated by cup 70c until the axis of the cup is substantially horizontal, as illustrated by cups 70d, 70e and 70f. While each cup is in the horizontal position, a stemming or coring tube, which will be described hereinafter, is moved into the cup to impale the pear along its stem-blossom axis. The cup is then opened and the stemming tube is withdrawn, carrying the pear out of the cup. The cup is then tilted back to the pear receiving position 15° from the vertical as it completes its circuit and returns to the pear feeding position.

Figures 6, 7, 8, 9:
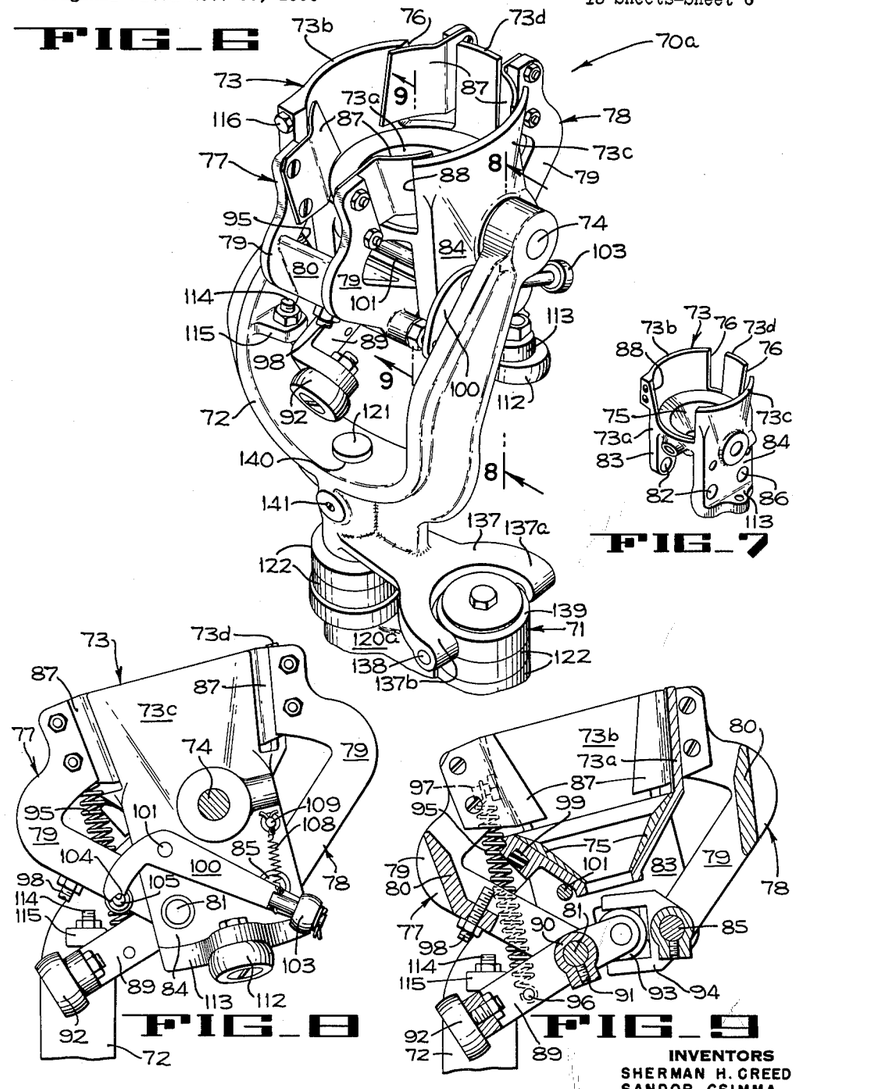
FIG. 6 is a perspective of a feed cup used in the feed mechanism of the present invention.
FIG. 7 is a reduced perspective of the main body portion of the feed cup of FIG. 6 shown removed from the feed cup assembly.
FIG. 8 is a vertical section taken on line 8—8 of FIG. 6.
FIG. 9 is a vertical section taken on line 9—9 of FIG. 6.

The feed cups 70a through 70h are identical. Accordingly, a description of cup 70a will fully disclose the structures of all of the cups. The cup 70a (FIG. 6) comprises a rigid yoke 72 in which a rigid cup body member 73 (FIGS. 6 and 7) is pivotally mounted on aligned pins 74 (only one pin being shown). The body member 73 has a central, frusto-conical guide portion 73a (FIGS. 7 and 9) and two partially cylindrical walls 73b and 73c that extend upwardly from opposite sides of the upper edge of the guide portion 73a. A removable, frusto-conical insert 75 (FIG. 9) is disposed in the guide portion 73a. It will be evident that the size of the insert may be varied according to the size of the pears being processed. A third wall portion 73d (FIG. 7) projects upwardly between the opposed ends of the walls 73b and 73c to define a pair of vertical slots 76. Two movable jaws 77 and 78 (FIG. 6) are pivotally mounted on the body member 73. These jaws are identical but are oppositely disposed, each jaw comprising a pair of bent arms 79 (FIG. 9) which are connected by a strap 80. Near their lower edge, the arms 79 of the movable jaw 77 are keyed to a shaft 81 which is rotatably journalled at its ends in aligned apertures 82 (FIG. 7) provided in depending legs 83 and 84 of the rigid body member 73. Similarly, the arms 79 of the jaw 78 are keyed to a shaft 85 which is rotatably supported in aligned apertures 86 in the legs 83 and 84, one aperture only being shown. At their upper ends, each arm 79 carries a curved pear-gripping plate 87. The plates 87 of the movable jaw 77 extend through an open space 88 (FIG. 7) between the side edges of the walls 73b and 73c, while the plates 87 of the movable jaw 78 extend through the vertical slots 76 on the opposite side of the body member 73.

The movable jaws 77 and 78 are pivoted relative to each other by an actuator arm 89 (FIG. 9) that has a hub 90 secured to the shaft 81 by a set screw 91. At one end, the actuator arm 89 carries a cam follower roller 92 and, at the other, it carries a rotatable roller 93 that is disposed in a socket of a U-shaped member 94 which is secured to the shaft 85. It will be evident that, when the actuator arm 89 is pivoted in a counterclockwise direction (FIG. 9) about the axis of shaft 81, the jaws 77 and 78 will be moved away from each other to an open position suitable to receive a pear placed therein by the operator.

The actuator arm 89 is pivoted counterclockwise to open the jaws by means of a cam, which will be explained presently, and this movement is made against the resistance of a spring 95 (FIG. 9) which is anchored at one end to a pin 96 projecting from the actuator arm 89 and is anchored at the other end to a pin 97 projecting from the rigid body member 73. Accordingly, as soon as the follower roller 92 moves out of engagement with its associated cam, the spring 95 moves the jaws 77 and 78 toward each other to a closed position wherein an adjustable stud 98, carried by the strap 80 of the jaw 77, abuts a resilient pad 99 which is positioned in a recess in the exterior wall of the frusto-conical guide portion 73a of the body member 73.

During a certain portion of the travel of the cup around its circuitous path, the jaws 77 and 78 are latched in an open position by means of a latch arm 100 (FIG. 8) that is mounted for pivoting movement on a pin 101 projecting from the body portion 73. A cam follower roller 103 is mounted for rotation on one end of the latch arm 100, and a V-shaped notch 104 is formed in the other end of the arm 100. A pin 105, projecting from one arm 79 of jaw 77, has a peaked upper portion arranged to engage in the V-shaped notch 104 to lock the jaws 77 and 78 in the open position of FIG. 8. A tension spring 108 is connected between the arm 100 and a pin 109 on the body portion 73 to urge the arm 100 in a counterclockwise direction about pin 101. Accordingly, when the actuator arm 89 is being cammed to jaw-open position, the notch 104 of the latch arm 100 is resiliently urged onto the peaked portion of the pin 105 to latch the jaws in open position.

As previously mentioned, as each cup moves around its circuitous path, it is tilted to various positions. This tilting movement is effected by means of a cam follower roller 112 (FIG. 8) that is mounted for rotation in a shelf 113 (FIG. 7) that projects laterally from the lower end of the leg 84 of the body member 73. An adjustable stud 114 (FIG. 6) is mounted in a tab 115 that is integrally formed on the inner face of one of the legs of the yoke 72. A capscrew 116 threaded in the upper end of the body portion 73, is arranged to engage the top of the stud 114 to arrest the pivoting movement of the cup when the cup reaches a horizontal position.

Figure 5:
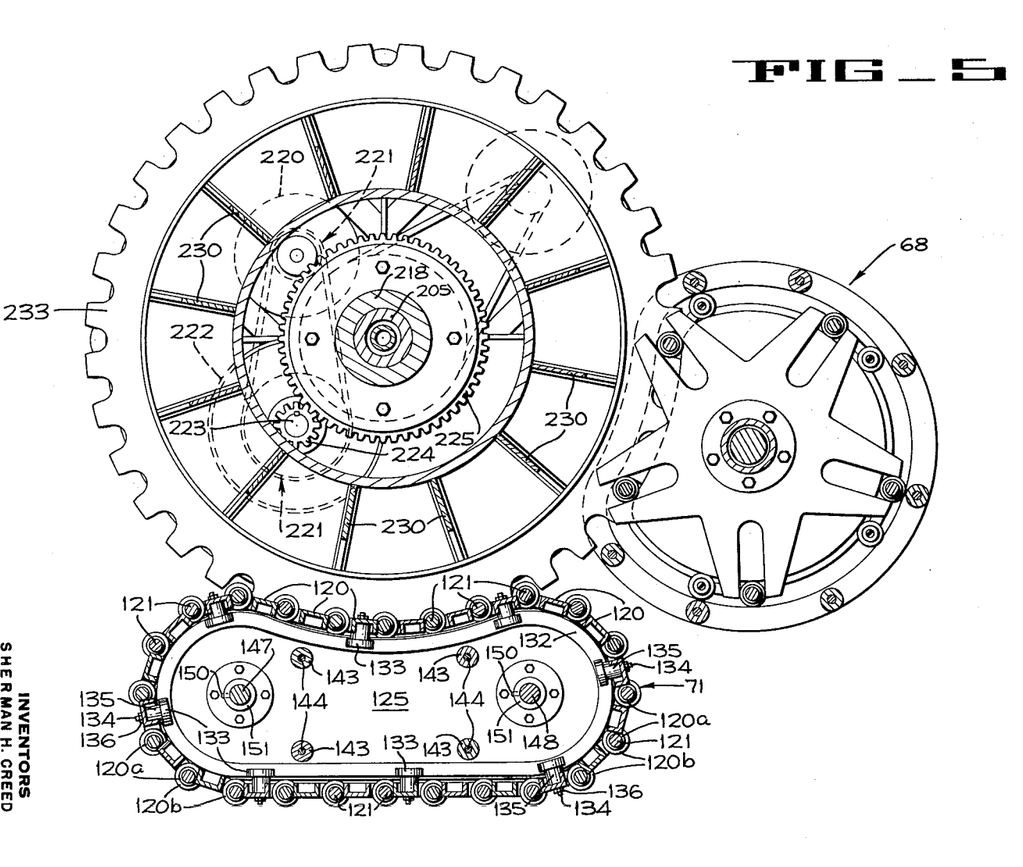
FIG. 5 is a horizontal section taken on line 5—5 of FIG. 3.
Figure 10:
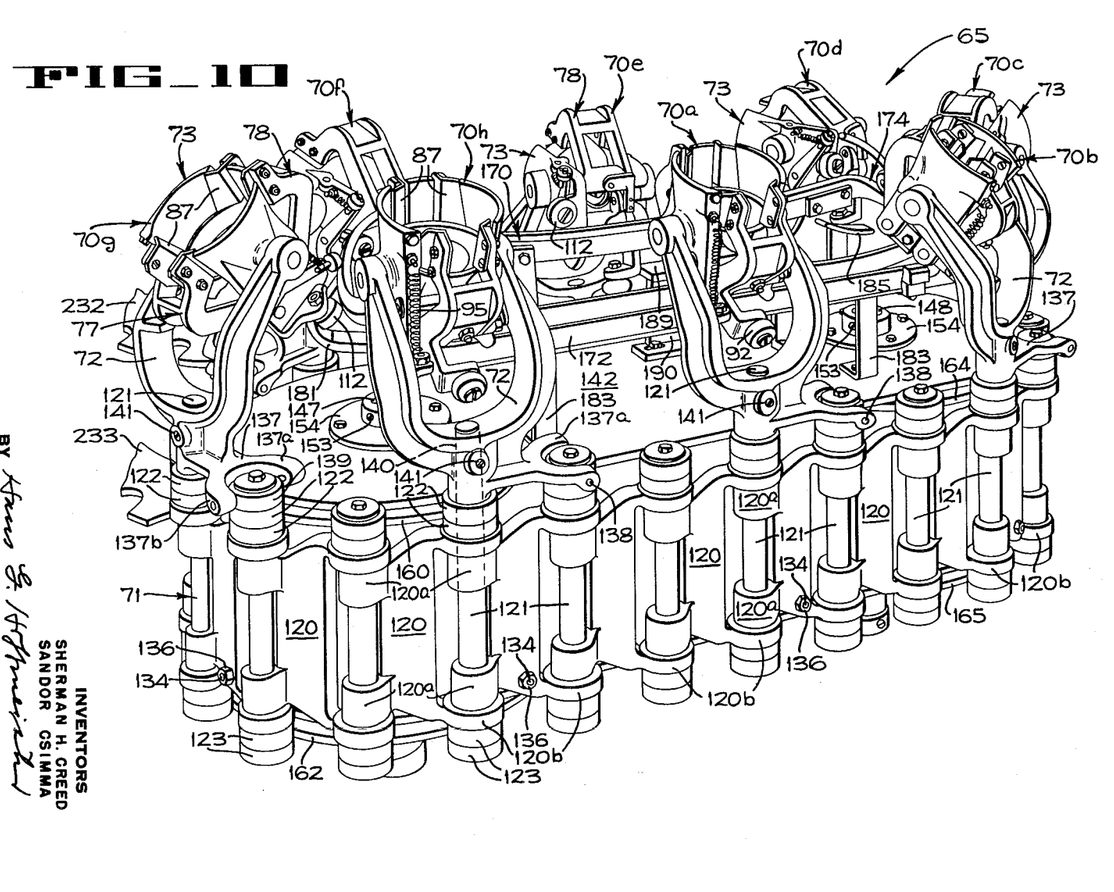
FIG. 10 is an enlarged perspective of the entire feed mechanism of the machine of FIG. 1, shown as removed from the rest of the machine.

The endless chain carrier 71 (FIG. 3) on which the cups are mounted comprises a plurality of vertical plates 120 (FIG. 10) pivotally mounted on vertical pins 121. Each plate 120 has a pair of trailing hubs 120a which receive a trailing pin 121 and a pair of leading hubs 120b which receive a leading pin 121. Two rotatable rollers 122 are mounted on the upper end of each pin 121 and two rotatable rollers 123 are mounted on the lower end of each pin 121. The carrier 71 is supported by a horizontal plate 125 (FIG. 3) which s secured in fixed position on a plurality of pads 126 projecting upwardly from a flat platform 127. The platform is connected to a generally cylindrical support base 130 by a plurality of vertical webs 131, only one of which is illustrated in FIG. 3. As seen in FIG. 5, the horizontal support plate 125 has a generally oval shape with circular end portions, and is provided along its outer edge with a raised track 132 along which a plurality of rollers 133 ride. Each roller is mounted on a shaft 134 which extends through a spacer collar 135 and through one of the plates 120 of the carrier 71. A nut 136 is disposed on the threaded end of each shaft 134 to lock the roller 133 on the plate. A sufficient number of rollers are provided to transfer the entire vertical component of the weight of the carrier 71 and the cups to the lower support plate 125.

Each cup is connected to the carrier 71 by means of a fork 137 (FIG. 10) which is integrally formed at the lower end of the yoke 72 and projects laterally from the shank of the yoke. Each of the arms 137a and 137b of the fork 137 is pivotally mounted on a pin 138 that has an end disposed in a roller 139 which is mounted for rotation on the upper end of one of the pins 121 of the carrier. The conveyor pin 121, which is immediately behind the pin on which the yoke is mounted, extends upwardly through an opening 140 in the shank of the yoke 72 and is secured therein by a setscrew 141.

An upper support plate 142 (FIG. 3) is mounted directly above the support plate 125 and is held in spaced relation thereto by four vertical spacer tubes 143 (FIGS. 3 and 5). The plates 125 and 142 have the same configuration and are secured together by bolts 144 which extend through the plates and through the spacer tubes 143. The plates are also held in spaced relation by two shafts 147 and 148 (FIG. 5). At its lower end, each of the shafts 147 and 148 is secured by a setscrew 150 to a hub 151 bolted to the upper surface of the lower support plate 125. At its upper end, each of the shafts 147 and 148 is secured by a setscrew 153 (FIG. 10) to a hub 154 bolted to the upper surface of the upper support plate 142.

As the endless chain carrier 71 travels around the left end (FIG. 10) of the elongated, generally oval frame provided by the support plates 125 and 142, the upper rollers 122 bear against a circular plate 160 which is disposed directly below the upper support plate 142 and is slightly larger in diameter than the circular ends of the plates 125 and 142. The lower rollers 123 bear against a similar lower circular plate 162. The circular plates 160 and 162 are mounted for free rotation on the shaft 147 and, accordingly, the chain is carried bodily around the left end of the frame on the plates. Similarly, at the right end of the frame the rollers 122 and 123 bear against freely rotatable circular plates 164 and 165, respectively, which are disposed on the shaft 148.

Figure 16:
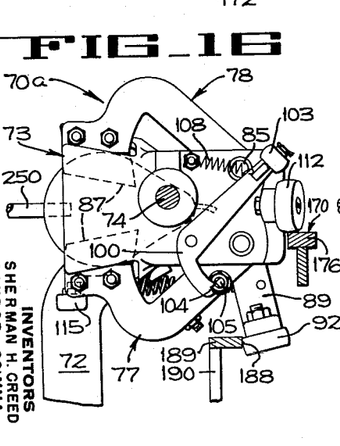
Figure 17:
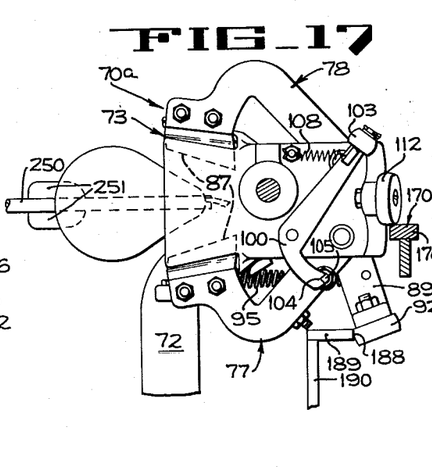
Figure 18:
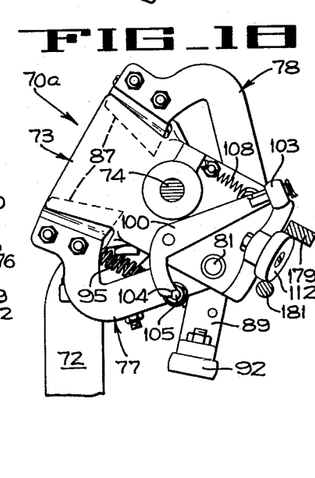

Each feed cup is moved to its various tilted positions as it travels around the upper support plate 142 by means of a fabricated cam track 170 (FIG. 11) which is mounted on the upper plate 142 and which receives the roller 112. The track 170 has a generally straight portion 172 on the operator's side of the feed mechanism. This portion 172 has a U-shaped transverse cross-section (FIG. 12) with its side walls inclined about 15° from the vertical so that the roller 112 holds the cup in a corresponding tilted position. After a pear is placed in the cup, the cup is moved toward the right (FIG. 11), as indicated by arrow B, until the roller 112 engages a twisted cam section 174 where the side along which the roller was moving is turned gradually to an inclined surface, as at 174a, and finally to a substantially horizontal surface at 174b. Thus, as the roller 112 moves around the right hand end of the upper plate 142, the axis of the roller is moved from approximately 15° from the vertical to an approximately horizontal position as shown in FIG. 16. It will, of course, be evident that the axis of the cup will also be moved to a horizontal position. The roller 112 then is moved toward the left, as indicated by arrow C, (FIG. 11) along the horizontal surface 176 of a track 177. At the left hand end of the machine, the roller rides onto a twisted cam surface 179 and is gradually turned back to the 15° from vertical pear-receiving position as it is returned to the substantially straight portion 172 of the track. If desired, auxiliary guide members 181 and 182 may be mounted at the left and right ends, respectively, of the track to assist the guiding of the cups around the ends of the track. The track 170 is supported at a predetermined elevation above the plate 142 by a plurality of brackets 183 which are secured to the plate 142 and extend upwardly therefrom.

Figures 11, 12:
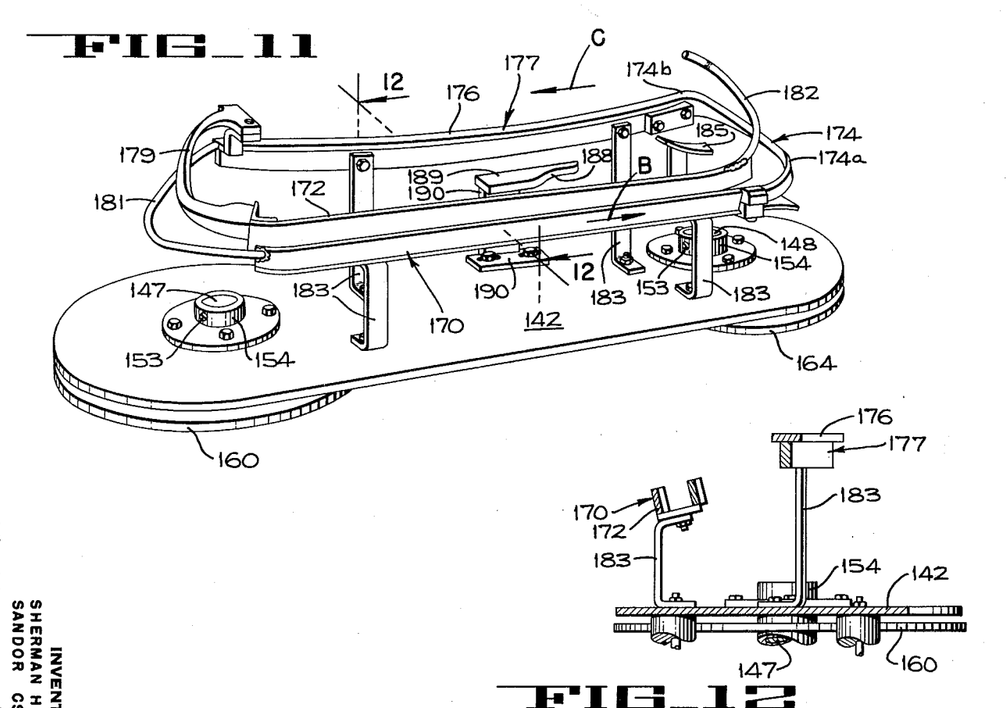
FIG. 11 is a perspective of the upper portion of the feed mechanism of FIG. 10, said upper portion being removed from the rest of the feed mechanism.
FIG. 12 is a vertical section taken on line 12—12 of FIG. 11.
Figure 13:
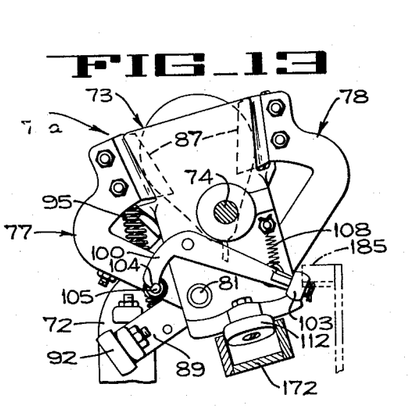
FIGS. 13-18, inclusive, are side elevations of one of the fruit feeding cups of the feed mechanism of FIG. 10, showing successive operational positions of the cup
Figure 14:
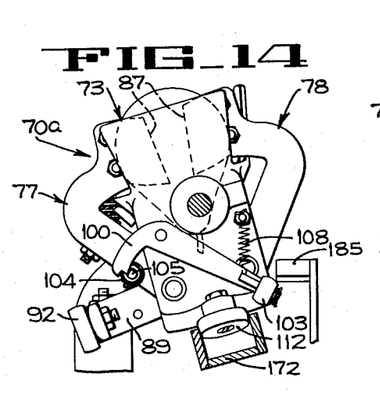
Figure 15:
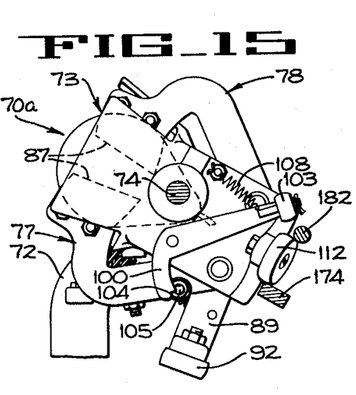

At the beginning of the feeding operation, the operator places the pear in the conveniently tilted, open cup (FIG. 13). As the cup is moved toward the right, the roller 103 (FIG. 14) of the latch arm 100 rides under a cam plate 185 (FIG. 11) and is tripped thereby, permitting the spring 95 to close the movable jaws of the cup against the pear. As seen in FIG. 11, the inclined cam plate 185 is mounted on one wall of the U-shaped track portion 172.

After the pear has been impaled on a stemming tube (FIG. 16), the cup is moved back to open, latched position by the engagement of the roller 92 (FIG. 16) of the actuating arm 89 with an inclined surface 188 (FIG. 11) of a cam 189 that is mounted on a bracket 190. As previously mentioned, when the cup reaches its open position, the notch 104 of the latch arm is spring urged into engagement with the peaked portion of the pin 105. Therefore, after the roller 92 passes out of engagement with the cam surface 188, the jaws remain in open position.

Referring to FIG. 3, it will be noted that the cylindrical base 130 has three support posts 200 which rest on a surface such as a floor. An upright tubular member 201 is disposed concentrically of the base at the center thereof and is rigidly secured to the base by a plurality of radially extending flanges 202. An apertured plate 203 is bolted across the lower end of the tubular support member 201 and a main shaft 205 is bottomed on the plate 203 inside the stationary support member 201 to which it may be secured by any suitable means as by bolts. A cylindrical drum 206 is mounted in supported relation at the upper end of the stationary shaft 205. The drum has a central tubular member 207 and a plurality of radial webs 208 which connect the central tubular member 207 to a base plate 209 and an outer wall 210. The drum is supported by the stationary support shaft 205 and is keyed thereto so that the drum cannot rotate and, accordingly, it provides a suitable support for several stationary cams which control operating mechanisms of the machine, as will be explained presently.

In the present pear processing machine, the rotary turret 66 carries twelve separate and complete processing units 67 which are schematically shown in FIG. 4. As the turret 66 rotates clockwise, each unit removes a pear from a feed cup, firmly seats the pear on a stemming tube, peels the pear, and cuts off the stem end of the pear. By the time these operations are completed, the unit is disposed adjacent the discharge turret 68 to which the pear is transferred.

The turret 66 (FIG. 3) comprises a tubular drive member 218, which is disposed at the center of the machine around the stationary main shaft 205. The member 218 is driven by a motor 220 through a belt and pulley drive 221, a transmission unit 222, a drive shaft 223, a pinion 224 (FIG. 5) on the shaft 223, and a gear 225 that is bolted to a plate 226 (FIG. 3) which is welded to the drive member 218. Near its upper end the drive member 218 is rigidly connected to an outer cylindrical drive member 228 through a rigid, frusto-conical member 229. Thus, when the motor 220 is energized, the outer drive member 228 of the turret 66 is continuously rotated.

The outer cylindrical drive member 228 carries a plurality of vertical plates 230 (FIGS. 3 and 5) which are welded to the member 228 and project radially outwardly therefrom. A circular angle bar 231a (FIG. 3) is rigidly secured around the upper, outermost edges of the plates 230, and a circular strap 231b is welded around the lower outermost edges of the plates 230. A horizontal upper sprocket ring 232 (FIGS. 3 and 4) is secured to the upper flange 231a, and a lower sprocket ring 233 (FIGS. 3 and 5) is secured to the lower strap 231b. The sprocket rings 232 and 233 engage the upper and lower rollers 122 and 123, respectively, of the cup carrier 71 to drive it in synchronism with the several processing units 67 on the turret 66.

A framework 234 (FIGS. 2 and 3) is formed around the drum 206 by means of a plurality of vertical tubular members 235 which are mounted in upright spaced position on the upper surface of the circular angle bar 231a. A casting 236 (FIG. 19) is bolted on the upper end of each tubular member 235, and the several castings 236 are connected together by a tubular ring 237 which is bolted between spaced arms 238 and 239 of each casting. The castings 236 provide mounting means for mechanism of each pear processing unit 67 and accordingly, one upstanding tubular member 235 is disposed radially outwardly from each processing unit 67.

Figure 22:
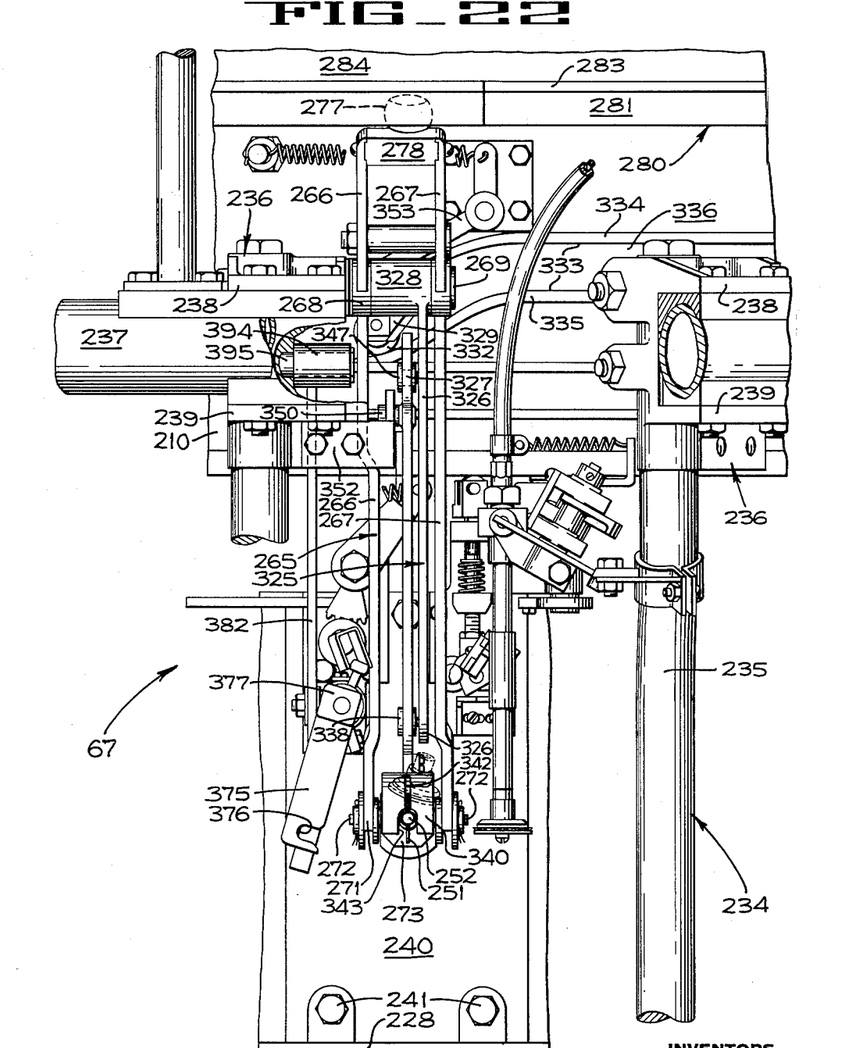
FIG. 22 is an enlarged fragmentary elevation of a portion of the main turret of the machine of FIG. 1 taken in the direction of arrows 22—22 of FIG. 19, particularly showing one of the several processing units on the main turret.

The twelve pear processing units 67 (FIGS. 4, 19, and 22) are identical, each unit comprising a vertical mounting plate 240 which is secured at its lower end to the outer drive member 228 of the turret by bolts 241. At the upper end of the mounting plate, a bolt 242 projects through the plate 240, and through a spacer sleeve 243 (FIG. 19) and is threaded in a hub plate 244 that is supported from the stationary main shaft 205 and mounted for rotation relative thereto. Each processing unit 67 includes a stemming tube 250 (FIG. 19) that has a pair of diametrically opposed fins 251. A stationary ejector rod 252 is disposed inside the stemming tube 250 and is connected at its innermost end to a tab 253 (FIG. 3) that extends upward from the inner end of a bracket 254 that is secured to the mounting plate 240.

Figure 20:
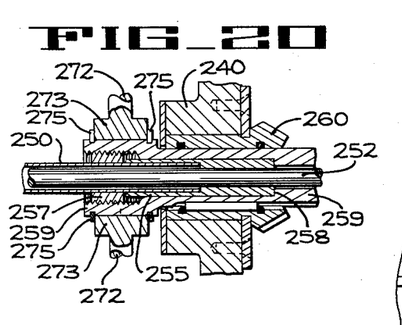
FIG. 20 is a sectional view taken on line 20—20 of FIG. 19.

The stemming tube 250 carries a tubular end portion 255 (FIG. 20) that is pressed on the tube 250 and is locked between a nut 257 and a shoulder 258 formed internally in a tubular drive member 259 on which a bevel gear 260 is keyed. With this arrangement, the stemming tube 250 is rotated when the gear 260 is driven and, at the same time, the stemming tube may be slid in and out of the mounting plate 240 which rotatably journals gear 260.

Figure 23:
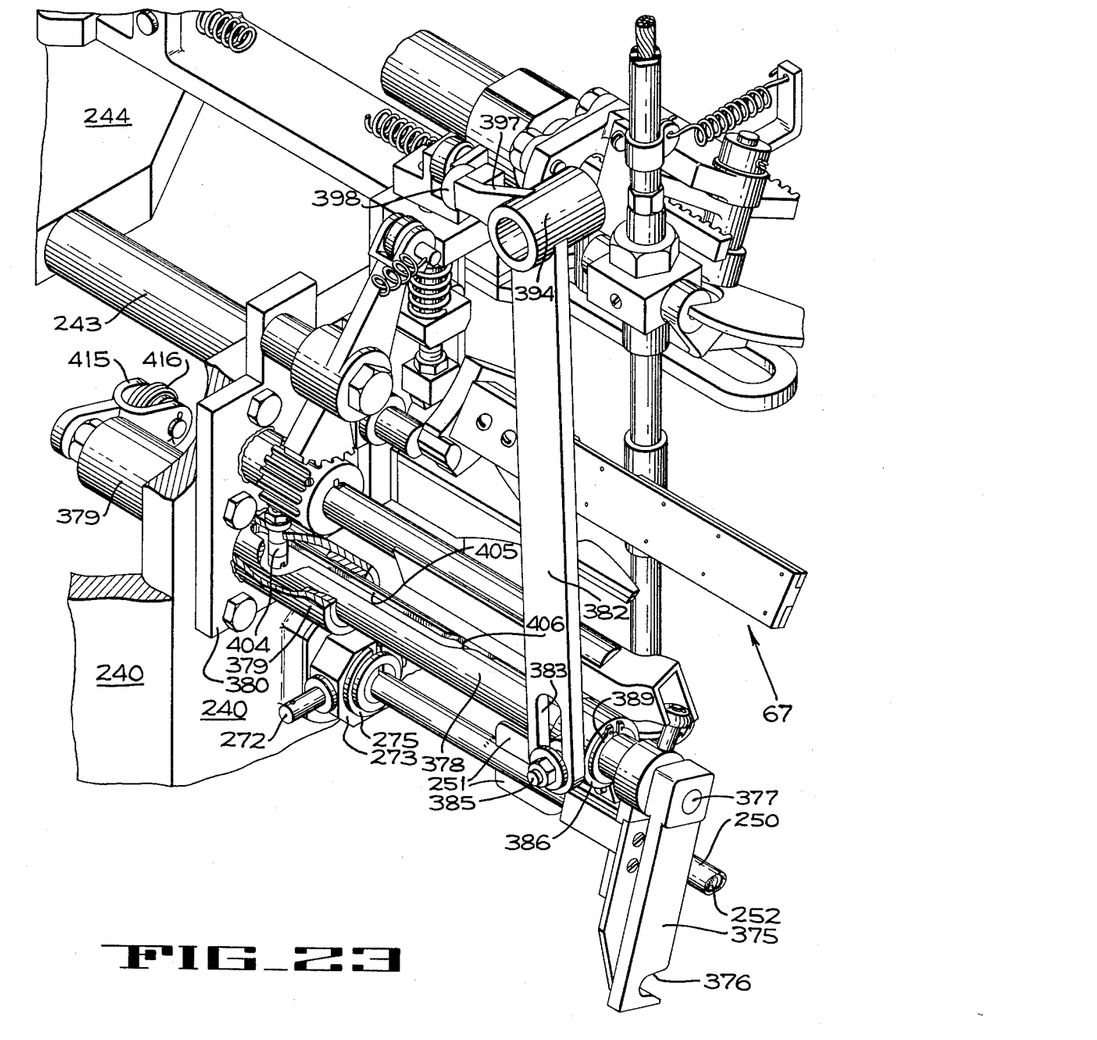
FIG. 23 is a fragmentary perspective of the processing unit shown in FIG. 22, parts being omitted and parts shown in section to fully disclose the operating mechanism.

The stemming tube 250 is moved in a radial direction in the mounting plate 240 by means of a lever 265 (FIGS. 19 and 22) which has two substantially identical, spaced arms 266 and 267. Each arm has a hub 268 mounted for pivoting movement on a short shaft 269 that projects outwardly from the casting 236. At its lower end, each lever arm 266 and 267 has a forked end portion 271 (FIG. 19) that has arms disposed on opposite sides of a pin 272 (FIG. 22) which projects outwardly from each side of a bearing block 273 (FIG. 23). The bearing block 273 is locked on the tubular drive member 259 (FIG. 20) of the stemming tube 250 by means of snap rings 275. As the lever 265 is pivoted about the short shaft 269, the forked ends of the lever move the stemming tube radially in or out of the mounting plate 240 of the turret.

The lever 265 is pivoted about shaft 269 by means of a cam follower roller 277 (FIG. 19) that is rotatably mounted on a bar 278 that is secured between the upper ends of the lever arms 266 and 267. The roller 277 is disposed in a cam track 280 formed between two flanges 281 and 282 which project downwardly from a horizontal plate 283. This plate 283 is rigidly secured to a circular member 284 that is welded to the exterior surface of the stationary drum 206. As seen in dotted lines in FIG. 2, the cam track 280 is bent inwardly at a point approximately directly opposite the longitudinal midpoint of the frame on which the cup carrier is mounted. As will be explained presently, when the cam follower 277 rides inwardly along this inwardly bent portion of the camming track, the stemming tube is carried radially outwardly of the main turret to impale a pear in the feed cup.

Each stemming tube is rotated by a bevel gear 290

(FIG. 19) that is in mesh with the bevel gear 260 which is keyed in driving relation on the drive member 259. The gear 290 is keyed to a vertical shaft 291 that is journalled in a lower wall 292 of a box-like extension of the mounting plate 240. At its lower end, the shaft 291 carries a gear 293 which is arranged to move into contact with a stationary gear segment 294 (FIG. 4) that partially encircles the main shaft 205. This gear segment 294 is secured to a plate 296 (FIG. 3) which projects horizontally from a hub of a stationary circular mounting member 297 that is keyed to the stationary main shaft 205. Accordingly, while the gear 293 is moved continuously with the turret in a circular path, it is rotated about its own axis only during a portion of its movement in said circular path. As will be explained hereinafter, the pear is peeled while it is being rotated on the stemming tube, and therefore the rotation of the stemming tube corresponds in length to the peeling phase of the pear processing cycle.

Figure 24:
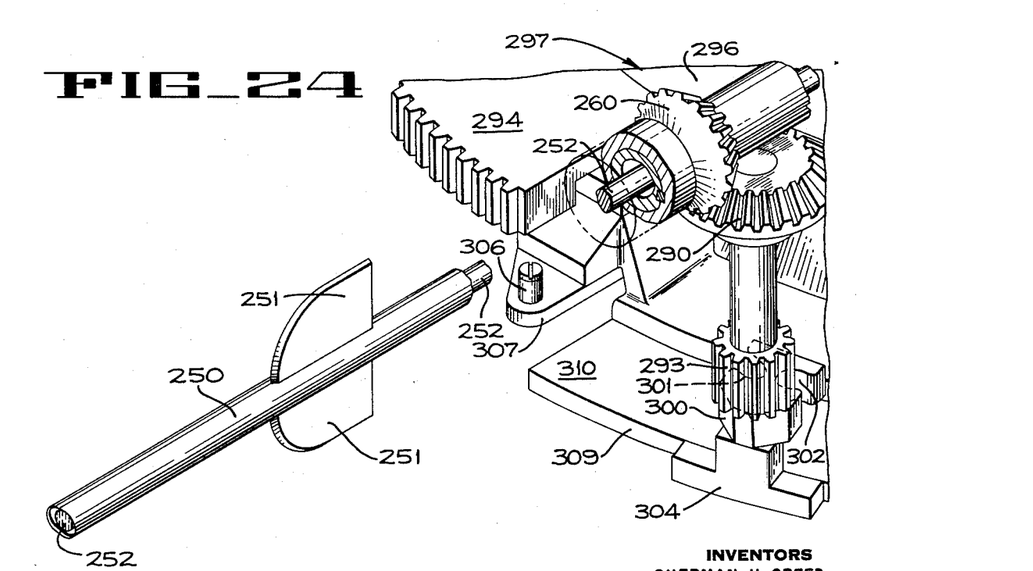
FIG. 24 is a fragmentary, enlarged perspective of the stemming tube drive mechanism of the machine of FIG. 1.

Each gear 293 is brought into smooth engagement with the gear segment 294 by means of a synchronizing block 300 (FIG. 24) that is secured to the lower face of the gear 293. The block 300 has two recesses 301 and 302 that open in opposite directions. A T-shaped locking bar 304 is secured to the bottom of the block 300. As the gear 293, which is being carried by the turret, approaches the entrance end of the gear segment, the recess 301 of the block 300 engages a pin 306 that is mounted in upright position on a bracket 307 (FIG. 24) secured to the stationary circular mounting member 297. The pin 306 is so positioned relative to the first tooth of the gear segment that the block 300 will be engaged and rotated to bring the teeth of the gear 293 into smooth meshing engagement with the teeth of the gear segment. It is to be noted that the locking bar 304 rotates with the gear 293 below the gear segment.

When the stemming tube 250 is not rotating, it must be held in a fixed position with the fins 251 disposed in a substantially vertical plane so that a forked butt clamp member, which will be described presently, can be moved longitudinally along the stemming tube past the fins. The stemming tube is held in this fixed position by means of the locking bar 304. As the gear 293 moves out of engagement with the gear segment 294, the recess 302 of block 300 receives a pin, not shown, which is substantially identical to pin 306 and is mounted on the extension 307 of the circular mounting member 297. This contact of the pin with the walls of the recess causes the locking bar 304 to be rotated so that it is moved smoothly into engagement with the outer peripheral edge 309 of a plate 310 that projects outwardly form the circular mounting 297. As seen in FIG. 4, the gear segment 294 extends around the stationary main shaft 205 for about 226°, while the locking plate 310 has an angular extent of about 134°.

Just before a stemming tube is moved into a pear, it is necessary that the pear be pressed into the feed cup in which it is carried so that the nose of the pear will be centered in the cup and the stem-blossom axis of the pear will be aligned with the stemming tube. This pear centering operation is carried out by a butt stop lever 325 (FIGS. 19 and 22), which is a composite member comprising two parallel, juxtaposed members, an actuating bellcrank 326 (FIG. 19) and a pear-contacting butt stop arm 327. The bellcrank 326 has a hub 328 rotatable on the short shaft 269 which projects outwardly from the adjacent casting 236. One arm 329 of the bellcrank carries a roller 332 which rides in a cam groove 333 provided by two spaced horizontal straps 334 and 335 that are secured to and project outwardly from a cylindrical support member 336 which is secured to the drum 206. At its lower end the bellcrank 326 carries a roller 338 which rides in an elongated opening 339 formed in the lower end of the butt stop arm 327. At its lower end, the arm 327 has a forked butt stop 340 which has a slot 342 (FIG. 22), terminating in an enlarged recess 343. The butt stop 340 is in alignment with the stemming tube 250, which is adapted to pass through the enlarged recess 343. When the stemming tube is in its non-rotating, locked position with the fins 251 disposed in a vertical plane, the uppermost fin is aligned with the slot 342 and is adapted to pass therethrough.

Figure 19:
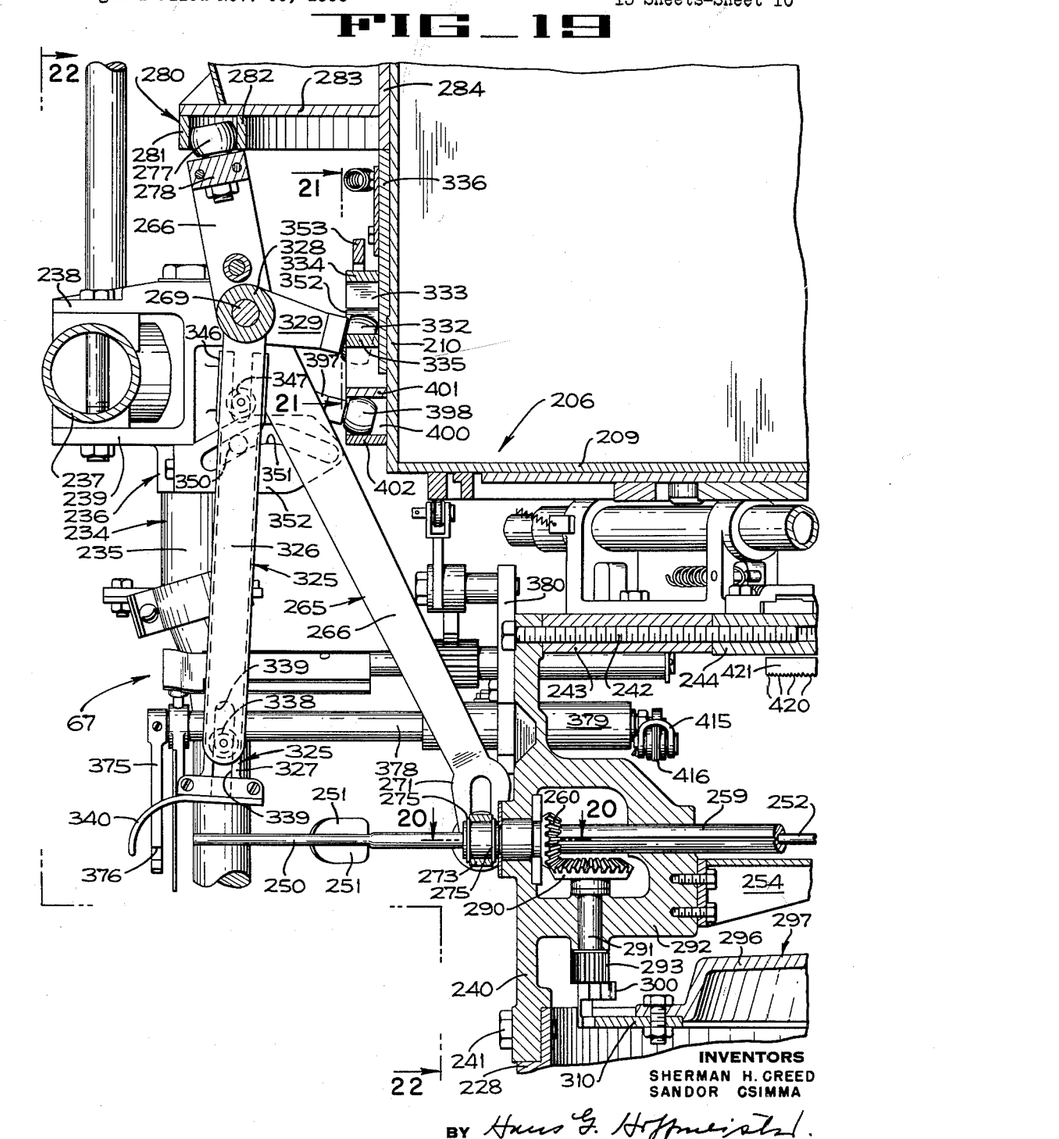
FIG. 19 is an enlarged fragmentary vertical section taken on line 19—19 of FIG. 2.

The butt stop arm 327 has a forked upper end 346 (FIG. 19) which receives a roller 347 rotatably carried by the bellcrank 326. Thus, when the bellcrank 326 is pivoted about shaft 269, the upper roller 347 and the lower roller 338 carried by the bellcrank 326 cause the arm 327 to swing with the bellcrank. In order that the butt stop 340 of the arm 327 will move in a substantially straight line path as it pushes the pear, the arm 327 carries a roller 350 (FIG. 19) which projects laterally into a camming groove 351 in a plate 352 secured to the casting 236. As best seen in FIG. 19, the groove 351 has an ascending and a descending portion designed to cause the butt stop 340 to move in a straight line path as it moves longitudinally along the stemming tube 250. It will be understood that the camming groove 333, which actuates the butt stop bellcrank roller 332, has a configuration adapted to cause the butt stop to move radially inwardly or outwardly at predetermined times in coordination with the movement of other operating mechanisms.

Figure 21:
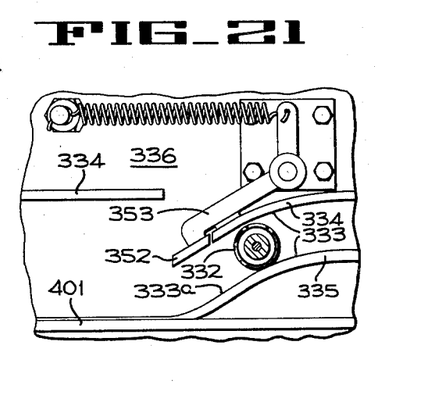
FIG. 21 is a fragmentary vertical section taken on line 21—21 of FIG. 19.

It will be evident from FIG. 19 that, when the roller 332 is moved downwardly, the arm 327 is pivoted clockwise and the butt stop 340 is moved to the left to engage a pear in a feed cup. At this point the pear is gripped by the jaws 77 and 78 and its stem end may be out of contact with the tapered seat in the cup. The butt stop 340 engages the pear and forces it inwardly in the cup causing the stem end of the pear to engage the seat of the cup and the pear to be centered. In FIG. 21, a downwardly inclined portion 333a of the groove 333 is illustrated. As the roller 332 travels down this inclined portion of the groove, the butt stop 340 is moved into engagement with the pear. Near the lower end of the groove, the roller 332 contacts a shoe 352 which is formed on the end of a spring loaded bellcrank 353 which causes the pressure of the butt stop 340 to be increased until the pear has been firmly seated. When the pear is seated, the bellcrank 353 will pivot clockwise and allow the roller 332 to pass thereunder, thus terminating the pressure of the butt stop of the pear. With this arrangement, the spring-loaded lever 353 assures the proper seating of the pear regardless of its size, and at the same time it prevents the application of excessive pressure to the pear.

At the time the stemming tube of each processing unit 67 withdraws a pear from the feed cup, the pear is not fully seated on the stemming tube. Before the peeling operation can be started, the pear must be fully seated on the tube and the butt end of the pear must be positioned at the particular location at which the cutter begins its peeling operation. This seating and positioning of the pear is effected by means of a nose stop 375 (FIGS. 19, 22 and 23) which is in the form of a bar having a notch 376 at its outer end. At its inner end the bar is secured to a short shaft 377 (FIG. 23) projecting from the end of a tubular shaft 378 which is journalled for sliding and rotating movement in a tubular bushing 379 fixed on a plate 380 that is arranged to be bolted to the mounting plate 240 of the associated processing unit. The bore of the bushing 379 is aligned with openings in the plates 240 and 380. The tubular shaft 378 is moved back and forth in the bushing 379 by means of a bellcrank 382 that has a slot 383 disposed at the lower end of one arm and adapted to receive a pin 385 projecting from a collar 386. The collar is locked against axial movement on the shaft by snap rings 389, one only being shown. The bellcrank 382 has a hub 394 pivotally mounted on a stub shaft 395 (FIG. 22) projecting from the casting 236 at a point below the shaft 269 on which the butt stop bellcrank 325 pivots. The other arm 397 (FIG. 19) of the bellcrank 382 has a roller 398 mounted for rotation thereon, said roller being disposed in a stationary camming channel 400 which is formed by two horizontal plates 401 and 402 projecting from the exterior wall 210 of the drum 206. The stationary camming channel 400 is so designed that, as the processing unit is carried in a circular path, the bellcrank 382 is pivoted in a clockwise direction (FIG. 23) causing the tubular shaft 378 to move radially inwardly. When the nose stop 375 has reached a predetermined radially inward position, a pin 404 (FIG. 23), that is carried by the stationary bushing 379 and is disposed in a camming slot 405 in the tubular shaft 378, engages a slanted portion 406 of the slot, causing the shaft to be rotated to swing the nose stop to a position wherein the notch 376 in the nose stop is disposed around the stemming tube 250. After the nose stop is in this pivoted position, the bellcrank 382 is pivoted further in the clockwise direction to cause the nose stop to engage the stem end of the pear and push it further onto the stemming tube which is stationary during this particular interval.

It is to be noted in FIG. 23 that the tubular nose stop shaft 378 has a laterally extending yoke 415 secured to its radially inner end. A roller 416, that has three peripheral rings of V-shaped cross section, is rotatable in the yoke. When the nose stop bar 375 is swung up to a position of alignment with the stemming tube, the yoke 415 and the roller 416 are also swung upwardly to a position wherein the upper V-shaped edges of the rings on the roller are at the same level as a plurality of elongated V-shaped grooves 420 (FIG. 19) formed on the lower surface of a locking plate 421 that has a hub 422 (FIG. 3) secured by setscrews to the stationary main shaft 205. As seen in FIG. 4, the locking plate 421 is not completely circular but has an angular extent of about 238°. FIG. 19 is a view taken at the turret position at which impaling of the pear is begun and at this position the nose stop has not yet been moved radially inwardly. Since the locking plate 421 does not begin until approximately 48° after the impaling station, it is evident that upward swing movement of the roller in FIG. 19 would not bring the roller 416 into contact with the V-shaped notches 420 of the locking plate. However, it will be understood that in each processing unit 67 the roller 416 is raised to a predetermined position as the nose stop is aligned with the stemming tube, and then it is moved radially inwardly, as the nose stop seats the pear, until it is in a radially inner position such that further rotation of the turret will move the threads of the roller 416 into engagement with the V-shaped grooves 420 in the locking plate. When the roller 416 is engaged with the plate in this manner, the nose stop is locked against further radial movement until the subsequent peeling and stem cut-off operations are completed.

When the pear has been fully seated on the stemming tube by the inward pushing movement of the nose stop, the butt of the pear comes into contact with the butt stop which has been previously withdrawn to a predetermined radially inward position. At the time that the butt of the pear hits the butt stop, the processing unit has been rotated approximately 35° from the fruit impaling station to a station which will be called the pear positioning station since at this position the butt end of each pear, regardless of the length of the pear, will be positioned at the same predetermined radially inward position at which the peeling cutter begins the peeling operation.

As previously mentioned, the remaining mechanisms of the machine are not part of the present invention but are fully disclosed in our pending application Serial No. 625,368, now Patent No. 2,979,093.

From the foregoing description, it will be evident that the present invention provides a novel efficient fruit orienting, centering and feeding mechanism. The mechanism presents the feed cups to the operator at a predetermined, advantageous, inclined angle to the vertical to permit the feeding of the pears to be carried out with a minimum of fatigue to the operator. The use of a butt stop to push the pear down into the tapered fruit-receiving chamber of each feed cup assures the accurate aligning of the pear with the impaling tube and minimizes losses due to improperly positioned pears.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended thereto.

Having thus described the invention, that which is believed to be new and for which protection by Letters Patent is desired is:

1. In a fruit preparation machine, a support member; cam means mounted on said support member; and a plurality of fruit feed cups mounted on said support member for movement along a predetermined path, each feed cup comprising a rigid body portion mounted on said support member, a pair of jaws pivotally mounted on said body portion, means interconnecting said jaws for simultaneous pivoting movement, a cam follower operatively connected to one of said jaws and disposed in engagement with said cam means for pivoting said jaws at predetermined points along the path of movement of said cups, a latch detent on one of said jaws, a latching arm pivotally mounted on said cup body portion, means defining a latching recess on said arm, and spring means connected between said arm and said body portion to urge said arm in a direction to move said recess into engagement with said latch detent as said jaws are pivoted to an open position.

2. In a fruit preparation machine, the combination of a support member; cam means mounted on said support member; and a feed cup comprising a rigid body portion mounted on said support member for movement along a predetermined path and for pivotal movement relative to said support member, a pair of opposed jaws pivotally mounted on said body portion for movement between open and closed positions, means interconnecting said jaws for simultaneous pivoting movement, a first cam follower operatively connected to one of said jaws and disposed in engagement with said cam means for pivoting said jaws between open and closed positions during movement of said cup along said path, a second cam follower connected to said body portion and disposed in engagement with said cam means to effect pivoting of said cup from an upwardly opening fruit receiving position to a horizontally opening fruit discharge position, releasably interengaging latch members respectively on said body portion and on one of said jaws for releasably holding said jaws in open position, and means on said support member engageable with one of said latch members during movement of said cup from receiving to discharging position to disengage said latch members and allow said jaws to move to closed position.

3. In a fruit preparation machine, the combination of a support member; a feed cup mounted on said support member for movement along a predetermined path, said cup comprising a rigid body portion pivotally mounted on said support member, a pair of opposed jaws pivotally mounted on said body portion, spring means urging said jaws to closed position, a cam follower on one of said jaws, a latch detent on one of said jaws, a latching lever pivotally mounted on said body portion and providing a latching recess, a cam follower on said latching lever, a spring connected between said body portion and said latching lever and arranged to pivot said lever in a direction to move said recess into engagement with said detent, a cam follower on said rigid cup body portion; and cam means mounted on said support member and having a plurality of camming surfaces, each camming surface being arranged to be engaged by a particular one of said cam followers, said camming surfaces being constructed and arranged to consecutively pivot said jaws to open position against the action of said spring means, pivot said cup to a position wherein the axis of the cup is inclined slightly from the vertical, pivot said latching lever in a direction to unlatch said jaws permitting the jaws to close about a pear in the cup, and pivot said cup to a position with the axis of the cup in a generally horizontal position.

4. In a fruit preparation machine, a feed cup adapted to hold a pear therein, means mounting said cup for movement in a fixed path, a rotary turret adjacent said cup mounting means, a pusher lever pivotally mounted on said turret, means for moving said feed cup and said turret in timed relation to bring said cup into confronting relation adjacent one end of said lever, a stationary support adjacent said turret, a cam track on said stationary support, a cam follower on said lever and disposed in said cam track, said cam track having a camming surface constructed and arranged to pivot said lever when said lever end and said cup are in confronting position and move said lever end into pushing engagement with a pear in the cup, and means providing a spring-loaded movable section in said camming surface arranged to yield and stop the pivoting movement of said lever when the pear resists the pushing movement of said lever with a predetermined force.

5. In a fruit preparation machine, a pair of elongated spaced plates defining a frame, a pair of circular plates mounted for rotation at each end of said frame, each plate having a peripheral edge projecting beyond the associated end of the frame, an endless chain carrier disposed around said frame and including a plurality of parallel pins, rollers rotatably mounted on said pins and arranged to engage the peripheral edges of said circular plates as said pins are moved around the ends of said frame, a plurality of fruit carriers mounted on said endless chain carrier, each fruit carrier being mounted on one of said pins, and means connected between said endless chain carrier and each fruit carrier for maintaining each fruit carrier in a predetermined orientation relative to said endless chain carrier.

6. In a fruit preparation machine, a rigid support frame; an endless chain carrier disposed in guided and supported relation on said frame, said carrier including a plurality of parallel pins and plates pivotally connecting adjacent pins; and a plurality of fruit carriers mounted on said endless chain carrier, each fruit carrier including a cup support member mounted on one of said pins and a yoke rigidly attached to said cup support member and pivotally mounted on a pin disposed ahead of said one pin in the direction of movement of the endless chain carrier.

7. In a fruit preparation machine, a feed cup adapted to hold fruit therein, means mounting said cup for movement in a fixed path about a predetermined first axis with said cup opening outward of said path, a rotary turret mounted for rotation about a second axis substantially parallel to said first axis, a pusher lever pivotally mounted on said turret for movement about a third axis normal to said second axis, means connected to said feed cup mounting means and to said turret for moving said cup and said lever in timed relation to bring said lever into confronting relation to said cup during a predetermined portion of movement of said cup in its path, a support mounted in fixed position relative to and adjacent said turret, a cam track on said support, and a cam follower on said lever and disposed in said track, said track having a camming surface for pivoting said lever when said lever and cup are in confronting relation to move said lever toward said cup into pushing engagement with fruit in said cup.

8. In a fruit preparation machine, a feed cup adapted to hold a fruit therein, means mounting said cup for movement in a predetermined path, a rotary turret adjacent to said cup mounting means, a pusher lever having a fruit engaging end portion and being mounted on said turret, means for moving said feed cup and said turret in timed relation to bring said cup into confronting relation adjacent said fruit engaging end portion of said lever, a support mounted in fixed relation to said turret and adjacent thereto, a cam track on said support, a cam follower on said lever and engaging said track, said track having a camming surface for moving said fruit engaging end portion toward said cup when said end portion and said cup are in confronting relation, and means providing a spring-loaded movable section in said camming surface for limiting movement of said fruit engaging end portion toward said cup.

9. In a fruit preparation machine, a support, a feed cup circumscribing a fruit receiving opening, means on said support mounting said cup for movement about an upright axis and through a fruit pressing station wherein said opening is directed radially outward from said axis, a turret, means mounting said turret on said support for rotation about a turret axis substantially parallel to said upright axis, a pusher lever having angularly related cam engaging and fruit engaging portions, means mounting said lever intermediate said portions thereof for pivotal movement about an axis tangent to a circle concentric with said turret, means synchronously motivating said turret and said cup mounting means for positioning said fruit engaging portion of said lever in confronting relation to said cup opening during movement thereof through said pressing station, and means on said support contacting said cam engaging portion of said lever for moving said fruit engaging portion toward said receiving opening when said lever is in said confronting relation.

10. In a fruit preparation machine, a support, a feed cup circumscribing a fruit receiving opening, means on said support mounting said cup for movement about an upright axis and through a fruit pressing station wherein said opening is directed radially outward from said axis, a turret, means mounting said turret on said support for rotation about a turret axis substantially parallel to said upright axis, a pusher lever having angularly related cam engaging and fruit engaging portions, means mounting said lever intermediate said portions thereof for pivotal movement about an axis tangent to a circle concentric with said turret, means synchronously motivating said turret and cup mounting means for positioning said fruit engaging portion of said lever in confronting relation to said cup opening during movement thereof through said pressing station, and yieldable means on said support in contact with said cam engaging portion of said lever for yieldably urging said fruit engaging portion toward said receiving opening when said lever is in said confronting relation.

11. In a fruit preparation machine, a support, a feed cup circumscribing a fruit receiving opening, means on said support mounting said cup for movement about an upright axis and through a fruit pressing station wherein said opening is directed radially outward from said axis, a turret, means mounting said turret on said support for rotation about a turret axis substantially parallel to said upright axis, a pusher lever having angularly related cam engaging and fruit engaging portions, means mounting said lever intermediate said portions thereof for pivotal movement about an axis tangent to a circle concentric with said turret, means synchronously motivating said turret and cup mounting means for positioning said fruit engaging portion of said lever in confronting relation to said cup opening during movement thereof through said pressing station, said fruit engaging portion having a slot disposed in a plane normal to the pivot axis of said lever, and a stemming tube mounted in said turret and having an axis projecting through said slot whereby said tube is adapted to project through said slot upon relative movement of said tube and said lever toward each other.

12. In a fruit preparation machine, a support member; cam means mounted on said support member; and a fruit feed cup comprising a rigid body portion mounted on said support member for movement along a predetermined path, jaws pivotally mounted on said body portion, means interconnecting said jaws for simultaneous pivoting movement, a cam follower operatively connected to one of said jaws and disposed in engagement with said cam means for pivoting said jaws during movement of said cup along said path, a first latch member on one of said jaws, a second latch member pivotally mounted on said body portion, said latch members having releasably engaging portions, and resilient means connected to said second latch member and to said body portion for urging said second latch member in a direction to move said latch engaging portions into engagement as said jaws are pivoted to open position.

13. In a fruit preparation machine, a support, a cup holding member, means mounting said holding member on said support for movement of said holding member in a circuitous path about a substantially upright axis, a cup having a fruit receiving opening and being supported in said holding member for pivotal movement about a cup axis substantially aligned with said path, said cup including jaws mounted for pivotal movement toward and away from each other, first cam means on said support and said cup for pivoting said cup about said cup axis between fruit receiving and discharging positions during movement of said holding member along said path, and second cam means on said support and connected to said jaws for moving said jaws toward and away from each other during travel of said holding member along said path thereby to hold fruit received in said cup in its receiving position and to release such fruit when said cup is in its discharging position.

14. In a fruit preparation machine, a support, a cup holding member, means mounting said holding member on said support for movement of said holding member in a circuitous path about a substantially upright axis, a cup having a fruit receiving opening and being supported in said holding member for pivotal movement about a cup axis substantially aligned with said path, first cam means on said support and said cup for pivoting said cup about said cup axis during movement of said holding member along said path, and means interconnecting said holding member and the mounting means for said holding member for maintaining said cup axis in substantial alignment with said path.

15. In a fruit preparation machine, a support frame; an endless chain carrier disposed in guided and supported relation on said frame, said carried including a plurality of substantially parallel pins and means pivotally interconnecting said pins in spaced relation circumferentially of said carrier; and a fruit carrier including a cup support member mounted on one of said pins and a rigid orienting member connected to said cup support member and substantially radially projecting from the pin on which said support member is mounted, and means interconnecting said orienting member and a pin adjacent to said one pin for maintaining said fruit carrier in a predetermined orientation relative to said chain carrier.

References Cited in the file of this patent

UNITED STATES PATENTS

| | | |
|---|---|---|
| 2,468,255 | Dunn | Apr. 26, 1949 |
| 2,642,212 | Currivan | June 16, 1953 |
| 2,761,549 | Smith | Sept. 4, 1956 |
| 2,786,562 | McClelland | Mar. 26, 1957 |
| 2,953,236 | Buchner | Sept. 20, 1960 |